United States Patent
Schmitt et al.

(10) Patent No.: US 11,321,852 B2
(45) Date of Patent: May 3, 2022

(54) METHOD FOR INITIALIZING A TRACKING ALGORITHM, METHOD FOR TRAINING AN ARTIFICIAL NEURAL NETWORK, COMPUTER PROGRAM PRODUCT, COMPUTER-READABLE STORAGE MEDIUM AND DATA CARRIER SIGNAL FOR CARRYING OUT SUCH METHODS, AND DEVICE FOR DATA PROCESSING

(71) Applicant: Jena-Optronik GmbH, Jena (DE)

(72) Inventors: Christoph Schmitt, Jena (DE); Johannes Both, Jena (DE); Florian Kolb, Jena (DE)

(73) Assignee: Jena-Optronik GmbH, Jena (DE)

( * ) Notice: Subject to any disclaimer, the term of this patent is extended or adjusted under 35 U.S.C. 154(b) by 364 days.

(21) Appl. No.: 16/296,820

(22) Filed: Mar. 8, 2019

(65) Prior Publication Data

US 2019/0279375 A1  Sep. 12, 2019

(30) Foreign Application Priority Data

Mar. 9, 2018 (DE) .................... 10 2018 105 544.7

(51) Int. Cl.
*G06T 7/246* (2017.01)
*G06T 7/73* (2017.01)
(Continued)

(52) U.S. Cl.
CPC ............ *G06T 7/251* (2017.01); *B64G 3/00* (2013.01); *G06T 7/75* (2017.01); *G01S 17/42* (2013.01);
(Continued)

(58) Field of Classification Search
None
See application file for complete search history.

(56) References Cited

U.S. PATENT DOCUMENTS

2007/0031064 A1\* 2/2007 Zhao .................. G06T 7/33
382/285
2015/0288947 A1 10/2015 Ahrns et al.
(Continued)

FOREIGN PATENT DOCUMENTS

DE  102014005181 A1  10/2015

OTHER PUBLICATIONS

Ruel, S. et al.; Target Localization from 3D data for On-Orbit Autonomous Rendezvous & Docking; In: 2008 IEEE Aerospace Conference. IEEE, 2008, S. 1-11.
(Continued)

*Primary Examiner* — Jonathan M Dager
*Assistant Examiner* — Garrett F Evans
(74) *Attorney, Agent, or Firm* — Dorton & Willis, LLP (57) ABSTRACT

A method for initializing a tracking algorithm for target objects, includes generating a 3D point cloud of the target object and iteratively determining a spatial position and orientation of the target object using a 3D model. A spatial position and orientation of the target object is first determined using an artificial neural network, thereafter the tracking algorithm is initialized with a result of this determination. A method for training an artificial neural network for initializing a tracking algorithm for target objects includes generating a 3D point cloud of the target object by a scanning method, and iteratively determining a spatial position and orientation of the using a 3D model of the target object. The artificial neural network is trained using training data to initially determine a spatial position and orientation of the target object and thereafter initialize the tracking algorithm with a result of this initial determination.

15 Claims, 4 Drawing Sheets

(51) Int. Cl.
*B64G 3/00* (2006.01)
*G01S 17/42* (2006.01)

(52) U.S. Cl.
CPC .............. *G06T 2207/10028* (2013.01); *G06T 2207/10032* (2013.01); *G06T 2207/20084* (2013.01)

(56) References Cited

U.S. PATENT DOCUMENTS

2017/0243352 A1* 8/2017 Kutliroff ............... G06T 19/006
2019/0147335 A1* 5/2019 Wang ................... G06N 3/0454
706/20

OTHER PUBLICATIONS

Opromolla, R. et al.; A Model-Based 3D Template Matching Technique for Pose Acquisition of an Uncooperative Space Object; In: Sensors, 15. Jg., 2015, Nr. 3, S. 6360-6382.

Trask, A.; Autonomous Artificial Neural Network Star Tracker for Spacecraft Attitude Determination; University of Illinois at Urbana-Champaign, 2002.

German Patent Office; References Cited in first Office Action in related German Patent Application No. 10 2018 105 544.7 dated Feb. 13, 2019; 1 page.

Sakurada Ken et al.; Temporal city modeling using street level imagery; Computer Vision and Image Understanding, Academic Press, U.S., vol. 157, pp. 55-71, (Feb. 8, 2017).

Ai Shangyou et al.; A Registration Method for 3D Point Clouds with Convolutional Neural Network; ICIAP; International Conference on Image Analysis and Processing (Sep. 9-13, 2013).

Christoph Schmitt et al.; RVS3000-3D: LIDAR meets Neural Networks; International Symposium of Artificial Intelligence, Robotics and Automation in Space, (Jun. 4, 2018); pp. 1-7.

French Patent Office; References Cited in Search Report in related French Patent Application No. 1902315 dated Jul. 29, 2021; 2 pages.

* cited by examiner

METHOD FOR INITIALIZING A TRACKING ALGORITHM, METHOD FOR TRAINING AN ARTIFICIAL NEURAL NETWORK, COMPUTER PROGRAM PRODUCT, COMPUTER-READABLE STORAGE MEDIUM AND DATA CARRIER SIGNAL FOR CARRYING OUT SUCH METHODS, AND DEVICE FOR DATA PROCESSING

CROSS-REFERENCE TO RELATED APPLICATIONS

This application claims the benefit of priority under 35 U.S.C. § 119(a) to German Patent Application DE 10 2018 105 544.7, filed Mar. 9, 2018 (pending), the disclosure of which is incorporated by reference in its entirety.

TECHNICAL FIELD

The invention relates to a method for initializing a tracking algorithm for aeronautical and/or astronautical target objects, wherein a 3D point cloud of the target object is generated and a spatial position and orientation of the target object is iteratively determined using a 3D model. The invention furthermore relates to a method for training an artificial neural network for initializing a tracking algorithm for aeronautical and/or astronautical target objects. The invention furthermore relates to a computer program product, to a computer-readable storage medium, and to a data carrier signal for carrying out such an initialization method and/or such a training method. The invention furthermore relates to a device for data processing.

BACKGROUND

The publications "Automatic Tracking Initialization from TriDAR data for Autonomous Rendezvous & Docking, S. Ruel1, Denis Quellet1, 2Timothy Johnson Luu, 2Denis Laurendeau, 1Neptec Design Group, 2¬Laval University" and "Fast Initial Pose Estimation of Spacecraft from LiDAR Point Cloud Data, F. Rems1, J. A. Moreno Gonzales1, T. Boge1, S. Tuttas2, U. Stilla, 1DLR, 2TU Munich" relate to first-time initialization methods for 6DOF tracking algorithms using the polygonal aspect hashing (PAH) technique.

For this purpose, initially a single scan polyline is extracted from a 3D point cloud, and afterwards a similar corresponding match polygon is ascertained using an algorithm in an a priori present 3D reference mode of a target object. The method is based on a search within a parameter table. Proceeding from individual reference points within the 3D reference model, all further model points are sorted, for example by distance and spatial direction. Based on geometric properties of the scan polygon, a search is then conducted within this table until a suitable match polygon candidate has been found. Thereafter, a relative transformation is calculated based on the two polygons. Then, information is provided as to the success of the search, for example by way of a mean error between the transformed scan and the model. If successful, an iterative closest point (ICP) algorithm is initialized with this solution. In the event of failure, the search starts with a new scan polygon or with other starting reference points in the parameter table. In addition to distances and spatial directions, the table can be expanded by further properties so as to optimize the search.

The publication "A model-based 3D template matching technique for pose acquisition of an uncooperative space object, R. Opromolla, G. Fasano, G. Rufino, M. Grassi, University of Naples" relates to a template matching technique for initializing an ICP algorithm. Model representations in the form of 3D point clouds of the reference model are created in the process. These are available to an onboard processor and can be used for a point-to-point ICP algorithm so as to calculate a mean error between the 3D template and the scan. Primarily, the mean value of the scan is used for position estimation. The position and orientation information of the template having the smallest error is then used to initialize the 6DOF tracking ICP algorithm.

A method for determining the position and orientation of objects, and in particular of uncooperative objects, is known from the published prior art DE 2 927 844 A1, wherein a 3D sensor supplies data of a target object, which is compared to the data of the target object stored in a model database and used for an initial position and orientation estimation as well as a subsequent more accurate position and orientation estimation of the target object.

SUMMARY

It is the object of the invention to improve methods mentioned at the outset. It is furthermore the object of the invention to provide computer program products mentioned at the outset. It is furthermore the object of the invention to improve a device mentioned at the outset structurally and/or functionally.

The object is achieved by methods, computer program products, and devices as shown and described herein.

The method can be used to be carried out in a spacecraft. The spacecraft can be a space station, a space shuttle, a crewed spacecraft, a space probe or a satellite. The method can be used to be carried out in an aircraft. The aircraft can be an airplane. The method can be carried out during operation of the spacecraft or of the aircraft. The method can be carried out autonomously in the spacecraft or in the aircraft. The method can be a computer-based method.

The tracking algorithm can be used for relative navigation. The tracking algorithm can be used to navigate a spacecraft or an aircraft relative to an aeronautical and/or astronautical target object. The tracking algorithm can be used for the pose estimation and/or pose tracking of an aeronautical and/or astronautical target object. The pose estimation can include an orientation estimation and/or a position estimation. The pose tracking can include orientation tracking and/or position tracking. The tracking algorithm can be a 6DOF tracking algorithm. The tracking algorithm can utilize iterative closest point (ICP) algorithms. The tracking algorithm can iterate from scan to scan, wherein each scan can be initialized with a result of a preceding scan.

The aeronautical and/or astronautical target object can be a spacecraft. The spacecraft can be a space station, a space shuttle, a crewed spacecraft, a space probe or a satellite. The aeronautical and/or astronautical target object can be an aircraft. The aircraft can be an airplane. The aeronautical and/or astronautical target object can be at least one astronomical object. The at least one astronomical object can be a sun, a planet or a star. The aeronautical and/or astronautical target object can be a constellation of multiple astronomical objects. The aeronautical and/or astronautical target object can be uncooperative. The target object can move. The target object can tumble. The target object can tumble about three axes. The target object can tumble by up to 2 to 4 deg/s.

The 3D point clouds can be generated by way of a scanning method. The scanning method can be an optical method including time-of-flight measurement. The scanning method can be a laser scanning method. The scanning method can be a light detecting and ranging (LiDAR) method. The scanning method can be a 3D LiDAR method. The scanning method can be carried out repeatedly. Using the scanning method, 3D point clouds of the target object can be repeatedly generated. The 3D point clouds can be generated by way of a flash LiDAR or a stereo camera.

The 3D point cloud of the target object can comprise a set of points of a vector space. Each of the points can be detected by the space coordinates thereof. Additional attributes can be detected for each of the points. The 3D point cloud of the target object can be generated during operation of the spacecraft or of the aircraft. The 3D point cloud can be stored.

The 3D model of the target object can have been previously created. The 3D model of the target object can be stored. The 3D model of the target object can be available in the spacecraft or in the aircraft.

The spatial position and orientation of the target object can be determined in six degrees of freedom. The spatial position and orientation of the target object can be determined by translation along three perpendicular axes and rotation about the three axes.

The initial determination can be used to estimate a spatial position and orientation of the target object close to the solution. The initial determination can be used to estimate a spatial position and orientation of the target object in a manner that is close to the solution in such a way that a convergence of the tracking algorithm is ensured when the tracking algorithm is initialized using a result of the initial determination.

A scan polygon can be extracted from the 3D point cloud for the initial determination. The ascertained scan polygon can be transferred to the artificial neural network. Using the artificial neural network, a match polygon can be ascertained from the 3D model of the target object. The match polygon can correspond to the scan polygon.

Using the artificial neural network, the scan polygon and the match polygon can be compared to one another. An assignment between the scan polygon and the match polygon can be carried out using the artificial neural network. An agreement between the scan polygon and the match polygon can be qualitatively evaluated. For the qualitative evaluation of the agreement, a relative transformation can be ascertained between the scan polygon and the match polygon. For the qualitative evaluation of the agreement, a quality parameter can be used. A mean squared error (MSE) between the scan and the model can serve as a quality parameter.

The tracking algorithm can be initialized with the result of the initial determination when the agreement has a predefined minimum quality. Otherwise, a scan polygon can again be extracted from the 3D point cloud. The newly ascertained scan polygon can likewise be transferred to the artificial neural network. Using the artificial neural network, a match polygon can again be ascertained from the 3D model of the target object. The scan polygon and the match polygon can again be compared to one another. An agreement between the scan polygon and the match polygon can again be qualitatively evaluated. The tracking algorithm can be initialized with the new result of the initial determination when the agreement has the predefined minimum quality. Otherwise, the procedure can be repeated. The procedure can be repeated until a result of the initial determination has the predefined minimum quality.

A multi-layer feed-forward network can be used as the artificial neural network. A network having at least two, and in particular at least three, hidden layers can be used as the artificial neural network. A network having at least 80, and in particular at least 100, neurons per layer can be used as the artificial neural network.

The artificial neural network can learn based on the training data using the training method. Weights between individual neurons can be modified. Learning rules can specify the manner in which the artificial neural network carries out changes. Learning can take place in the form of supervised learning. A correct output can then be predefined to optimize the weights. Learning can take place in the form of unsupervised learning. Changes in weight can then take place as a function of a similarity of the weights using input stimuli, without predefining an output.

The training data can comprise scan polygons and match polygons. The training data can be generated by way of a training data generator. The training data can represent a possible parameter space to carry out at least one of the methods disclosed herein.

The artificial neural network can be tested. A performance capability of the artificial neural network can be evaluated. The artificial neural network can be trained until the performance capability thereof has a predefined minimum level.

The methods disclosed herein can be computer-based methods.

The computer program product can be present in installable form. The computer program product can be installed on a computer. The computer-readable storage medium can be an electronic, a magnetic, a magnetoelectronic, an optical or an optoelectronic storage medium. The computer-readable storage medium can be a volatile, non-volatile semi-permanent or permanent memory. The computer-readable storage medium can be a non-rotating or rotating storage medium. The data carrier signal can be an electronic, a magnetic, a magnetoelectronic, an optical or an optoelectronic signal.

In particular optional features of the invention are denoted by "can." Accordingly, there is an exemplary embodiment of the invention in each case that includes the respective feature or the respective features.

The invention decreases the time required for initializing a tracking algorithm for aeronautical and/or astronautical target objects. A calculating speed is increased. A determination of a spatial position and orientation of the target object is made possible with such accuracy that a transition from the initialization to stable 6DOF tracking is ensured. An implementability in an FPGA is made possible or improved. A limitation to processor structures is eliminated. A complexity and/or a need for resources are reduced. A memory requirement is reduced. A data volume of the 3D point cloud to be analyzed is reduced. An assignment using comprehensive parameter tables is eliminated. A requirement to store comprehensive parameter tables or 2D/3D templates is eliminated. An implementation in FPGSs is made possible.

Exemplary embodiments of the invention will be described hereafter in greater detail with reference to the figures. Further features and advantages will be apparent from this description. Specific features of these exemplary embodiments can represent general features of the invention. Features of these exemplary embodiments that are combined with other features can also represent individual features of the invention.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
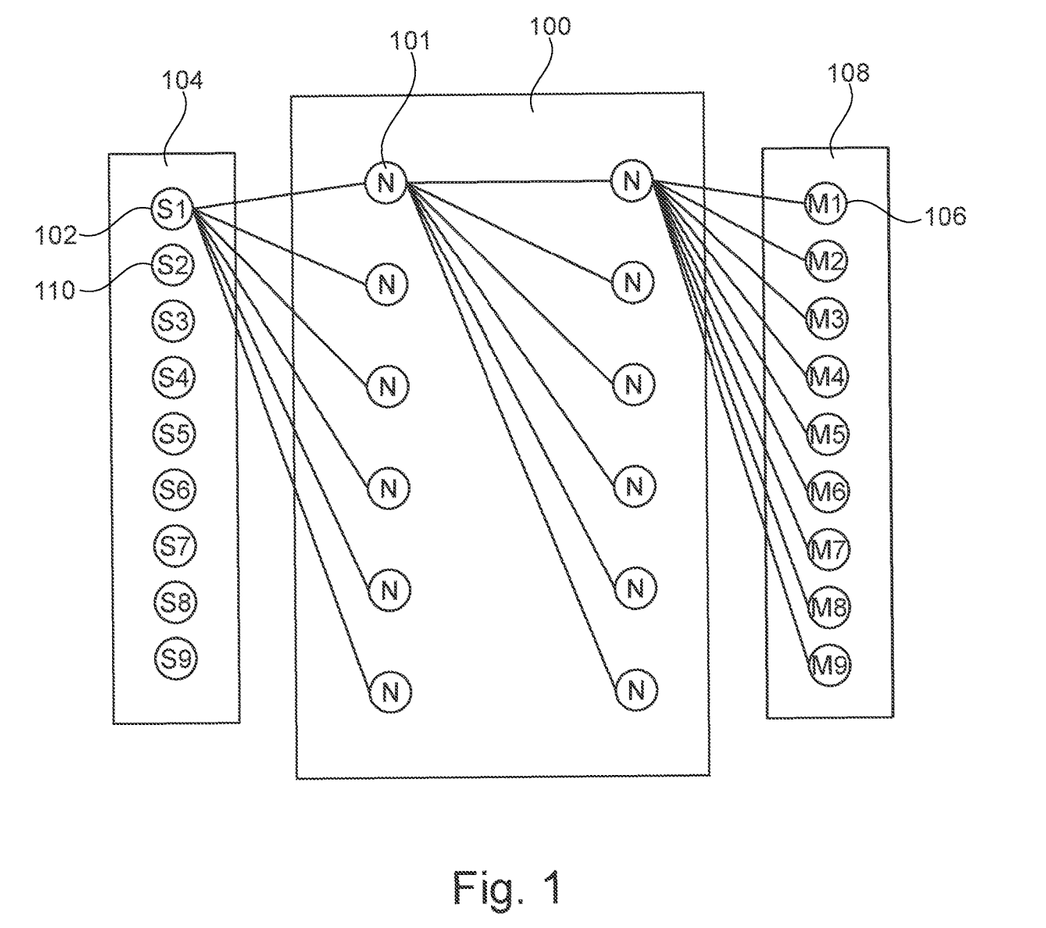
FIG. 1 shows an artificial neural network for initializing a tracking algorithm for aeronautical and/or astronautical target objects.

FIG. 1 shows an artificial neural network 100 comprising neurons, such as 101, for initializing a tracking algorithm for aeronautical and/or astronautical target objects. The neurons are also denoted by N in FIG. 1. The neurons can also be referred to as units. The artificial neural network 100 comprises input units, which are able to receive signals from the outside world, output units, which are able to relay signals to the outside world, and hidden units, which are located between input and output units and include an internal representation of the outside world. The tracking algorithm is carried out in a spacecraft, for example, and is used to detect and autonomously track a target object so as to enable relative navigation between spacecraft by way of a 3D LiDAR system.

Using the 3D LiDAR system, 3D point clouds of the target object to be tracked are generated. The point clouds are subsequently evaluated using suitable image processing algorithms, and the current position and orientation of the target object is calculated. Iterative closest point (ICP) algorithms are utilized for this purpose. Employing an iterative process and utilizing a 3D model of the target object, the ICP algorithm ascertains the relative position and orientation of the target object. A prerequisite for a convergence of the ICP algorithm is a suitable initialization of the method by way of a rough estimation close to the solution. So as to track a target object from scan to scan, the respective result of the preceding scan is used for initialization. For example, a target object moving at up to 5°/s is scanned by the 3D LiDAR system using a frequency of 2 to 4 Hz.

In the present example, an initial position and orientation estimation of the target object is ascertained from 3D point clouds using the artificial neural network 100. The result is subsequently used to initialize a 6DOF ICP tracking algorithm. For the initial position and orientation estimation, scan polygons are assigned to corresponding match polygons in a 3D model of the target object. The 3D model of the target object thus serves as a reference model. The assignment takes place by way of the artificial neural network 100.

Initially, a scan polygon, such as 102, is extracted from a 3D point cloud 104. Scan polygons are also denoted by S1 to S9 in FIG. 1. Thereafter, the scan polygon 102 is transferred to the artificial neural network 100, which calculates a corresponding match polygon, such as 106, in the 3D model 108 of the target object. Match polygons are also denoted by M1 to M9 in FIG. 1. A found polynomial candidate is used to calculate a relative transformation between the scan polygon 102 and the match polygon 106.

Thereafter, the ICP algorithm is initialized with the found solution, and the solution is refined by few iterations. Based on a quality parameter, it is now decided whether or not the found solution is considered sufficient. For example, the mean squared error (MSE) between the scan and the model can be used for this purpose. If the solution does not meet the defined criterion, a new scan polygon, such as 110, is extracted, and thus a new iteration is initiated.

Figure 2:
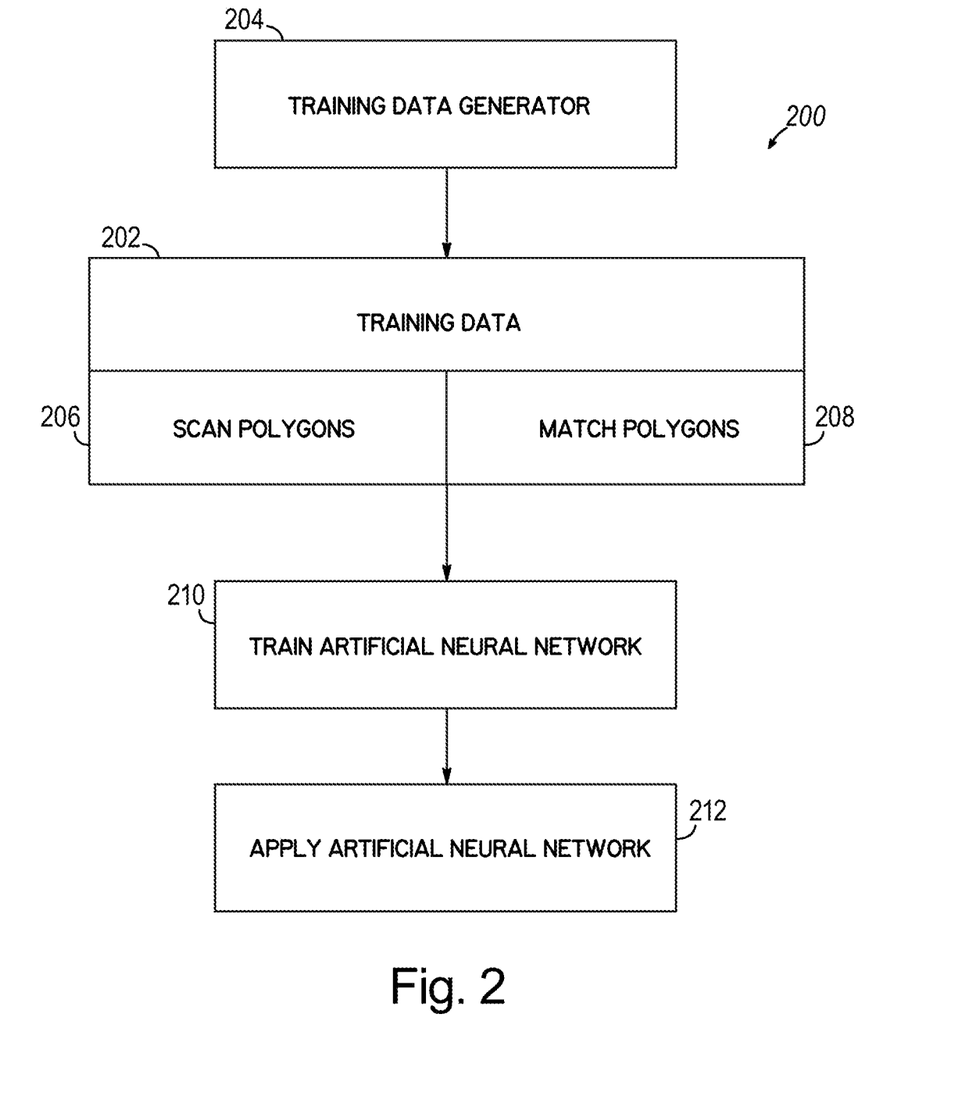
FIG. 2 shows a sequence for training an artificial neural network for initializing a tracking algorithm for aeronautical and/or astronautical target objects.

FIG. 2 shows a sequence 200 for training an artificial neural network, such as the artificial neural network 100 according to FIG. 1, for initializing a tracking algorithm for aeronautical and/or astronautical target objects.

The artificial neural network is trained using suitable training data 202, so that a performance capability of the artificial neural network extends across the trained parameter space. The training data 202 represents the possible parameter space in which the artificial neural network is applied after training.

The training data 202 is generated by way of a training data generator 204 and comprises scan polygons 206 for supplying the input units of the artificial neural network and corresponding match polygons 208, which would be expected as signals of the output units of the artificial neural network. For example, a virtual test bed or a real sensor for generating 3D point clouds based on a model can be used as the training data generator 204.

The generated training data 202 is used to train 210 the artificial neural network. After successful training, the artificial neural network is applied 212.

The training is carried out by way of algorithms based on the shared concept of backpropagation. The training algorithm is ended as soon as the artificial neural network has achieved a required performance quality.

Figure 3:
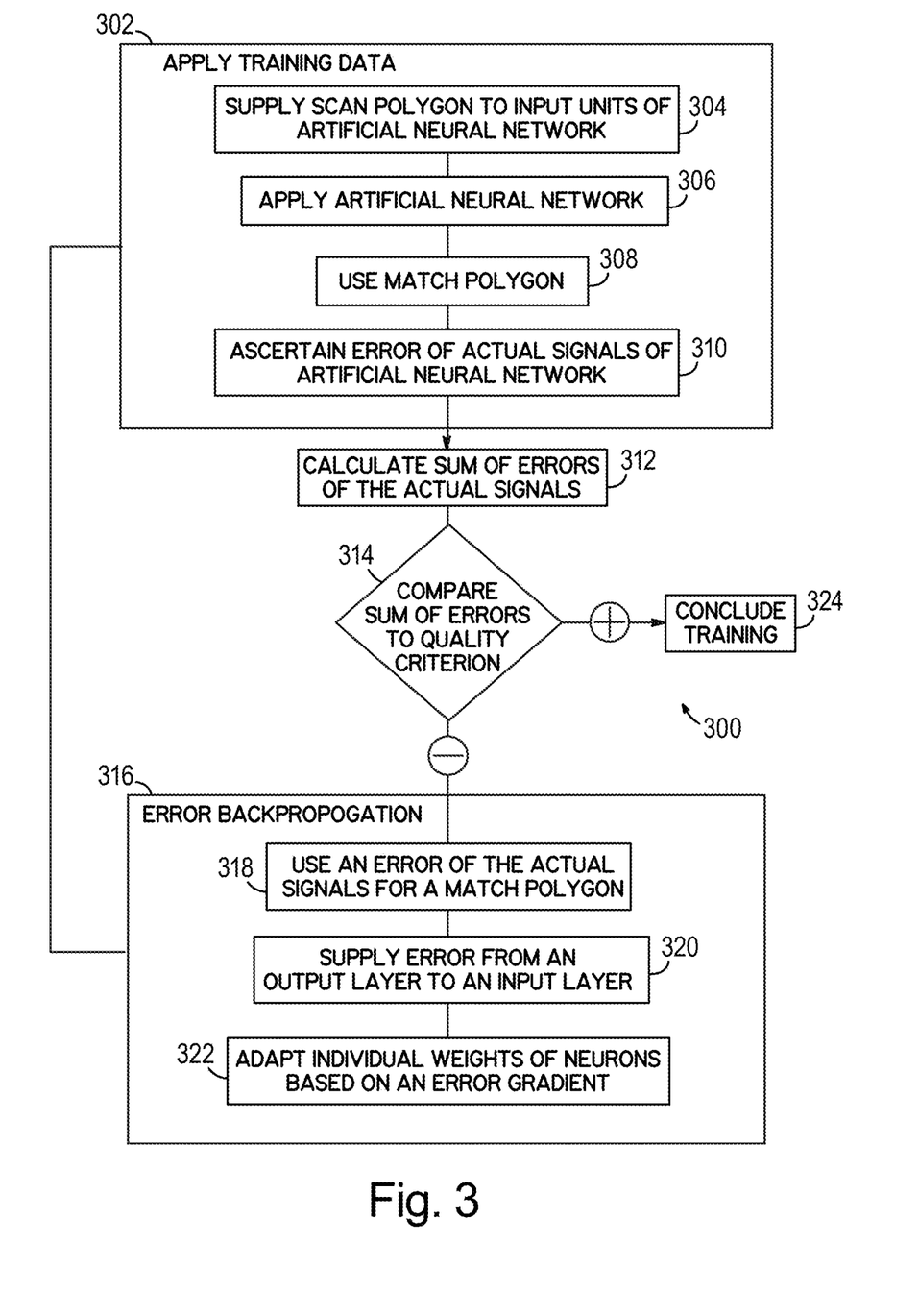
FIG. 3 shows a sequence for training an artificial neural network for initializing a tracking algorithm for aeronautical and/or astronautical target objects by way of backpropagation.

FIG. 3 shows a sequence 300 for training an artificial neural network, such as the artificial neural network 100 according to FIG. 1, for initializing a tracking algorithm for aeronautical and/or astronautical target objects by way of backpropagation.

Initially, the training data 302 is applied by supplying a scan polygon i to the input units of the artificial neural network in a step 304, by applying the artificial neural network in a step 306, by using a match polygon i, which would be expected as the signal of the output units of the artificial neural network, in a step 308, and thereby, in a step 310, ascertaining an error of the actual signals of the output units of the artificial neural network. The application of the training data 302 is repeated for a predetermined number i of training data. For example, the number is approximately 600 to approximately 1400 scan-match polygon pairs, and in particular approximately 1000 scan-match polygon pairs. A selection of the training data is made in a uniformly distributed manner across the required parameter space.

Thereafter, in a step 312, a sum of the errors of the actual signals of the output units of the artificial neural network which are ascertained during the repeated application of the training data 302 is calculated and, in a step 314, is compared to a quality criterion.

If the quality criterion is not met, an error backpropagation 316 is carried out, for example by way of the Levenberg-Marquardt algorithm, by using, in a step 318, an error of the actual signals of the output units of the artificial neural network for a match polygon i which would be expected as the signal of the output units of the artificial neural network, supplying this error, in a step 320, from an output layer of the artificial neural network to an input layer of the artificial neural network and, in a step 322, adapting the individual weights of the neurons of the artificial neural network based on an error gradient. The error backpropagation 316 is repeated for the predetermined number i of training data. Thereafter, the training data 302 is applied again, and the ascertained errors of the actual signals of the output units of the artificial neural network are compared to the quality criterion (step 314). If the quality criterion is met, the training is concluded in a step 324, and a trained artificial neural network is present. For example, the trained artificial neural network is fully connected and has two to four hidden layers, and in particular three hidden layers, and approximately 60 to approximately 140 neurons per layer, and in particular approximately 100 neurons per layer.

Figure 4:
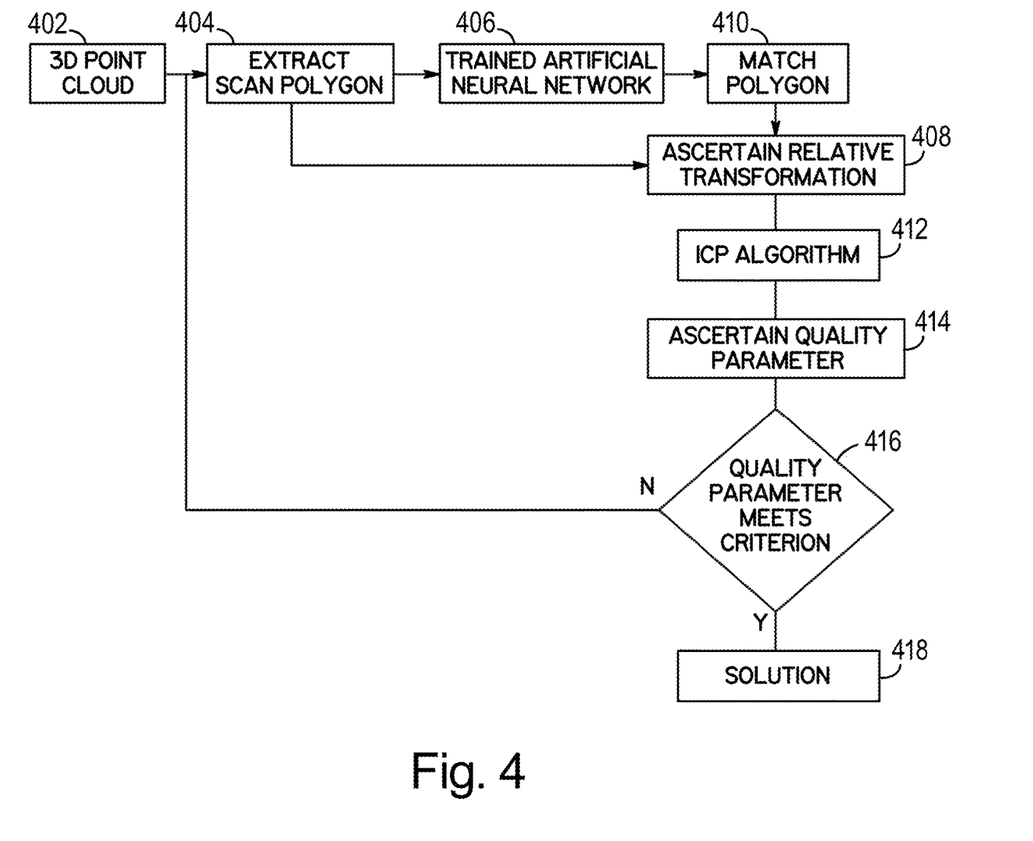
FIG. 4 shows a sequence for initializing a tracking algorithm for aeronautical and/or astronautical target objects.

The trained artificial neural network is integrated in the sequence 400 shown in FIG. 4 for initializing a tracking algorithm for aeronautical and/or astronautical target objects.

So as to initialize the tracking algorithm, a scan polygon 404 is extracted from a 3D point cloud 402 and supplied to the trained artificial neural network 406. Thereafter, a relative transformation 408 is ascertained between the scan polygon 404 and an ascertained match polygon 410, supplied to an ICP algorithm 412, and a quality parameter 414 is ascertained. This is carried out iteratively until the quality parameter 414 meets a predefined criterion 416, and a solution 418 has been reached.

The 3D point clouds generated in the training data generator are used to analyze a performance capability of the trained artificial neural network. For example, an initialization is simulated every 500 ms based on 2 Hz LiDAR point clouds over three full rotation periods of the target object from various distances.

The present method for initializing a tracking algorithm can be used, for example, to track spacecraft by way of 3D LiDAR and, in the terrestrial area, for the aerial refueling of aircraft. The algorithm can be used, for example, to analyze LiDAR data or to initialize a stereo camera system. The algorithm can be used, for example, to identify star constellations in the Star-Tracker area in that a polygon, consisting of identified stars, is received by a Star-Tracker, and IDs are then assigned to these in a star catalog.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS 100 artificial neural network
102 scan polygon
104 3D point cloud
106 match polygon
108 3D model
110 scan polygon
200 sequence
202 training data
204 training data generator
206 scan polygons
208 match polygons
210 training
212 application
300 sequence
302 application of the training data
304 step
306 step
308 step
310 step
312 step
314 step
316 error backpropagation
318 step
320 step
322 step
324 step
400 sequence
401 neuron
402 3D point cloud
404 scan polygon
406 trained artificial neural network
408 transformation
410 match polygon
412 ICP algorithm
414 quality parameter
416 criterion
418 solution

What is claimed is:

1. A method for initializing a tracking algorithm for aeronautical or astronautical target objects, the method comprising:
generating initial and subsequent 3-D point clouds of the target object from received sensor data;
determining, based on the initial 3-D point cloud, an initial spatial position and orientation of the target object using an artificial neural network;
starting with the initial spatial position and orientation, iteratively determining a current spatial position and orientation of the target object using a 3-D model of the target object, wherein iteratively determining is based on the point clouds and an iterative closest point (ICP) algorithm; and
tracking the target object according to the tracking algorithm by comparing the iteratively determined spatial position and orientation from a first one of the 3-D point clouds to the iteratively determined spatial position and orientation from a subsequent one of the 3-D point clouds.

2. The method of claim 1, wherein determining the initial spatial position and orientation comprises:
extracting a scan polygon from the 3-D point cloud; and
ascertaining, from the 3-D model of the target object using the artificial neural network, a match polygon corresponding to the scan polygon.

3. The method of claim 2, further comprising:
comparing the scan polygon and the match polygon with one another; and
qualitatively evaluating agreement between the scan polygon and the match polygon.

4. The method of claim 3, wherein qualitatively evaluating agreement between the scan polygon and the match polygon comprises determining a relative transformation between the scan polygon and the match polygon using the artificial neural network.

5. The method of claim 3, further comprising:
beginning the iterative determining of the current position using the result of the initial determination only when agreement between the scan polygon and the match polygon has a predefined minimum quality.

6. The method of claim 1, wherein the artificial neural network is a multi-layer feedforward artificial neural network.

7. The method of claim 1, wherein the artificial neural network has at least one of:
   at least two hidden layers; or
   at least 80 neurons per layer.

8. The method of claim 7, wherein the artificial neural network has at least one of:
   at least three hidden layers; or
   at least 100 neurons per layer.

9. A method for training an artificial neural network for initializing a tracking algorithm for aeronautical or astronautical target objects, the method comprising:
   generating initial and subsequent 3-D point clouds of the target object by scanning the target object;
   training the artificial neural network using training data that represents a possible parameter space of the target object;
   determining an initial spatial position and orientation of the target object based on the initial 3-D point cloud and using the trained artificial neural network;
   starting with the initial spatial position and orientation, iteratively determining a current spatial position and orientation of the target object using a 3-D model of the target object, wherein iteratively determining is based on the point clouds and an iterative closest point (ICP) algorithm; and
   tracking the target object according to the tracking algorithm by comparing the iteratively determined spatial position and orientation from a first one of the 3-D point clouds to the iteratively determined spatial position and orientation from a subsequent one of the 3-D point clouds.

10. The method of claim 9, wherein the training data comprises scan polygons and match polygons.

11. The method of claim 9, further comprising generating the training data using a training data generator.

12. The method of claim 9, further comprising evaluating a performance capability of the artificial neural network.

13. The method of claim 12, wherein training the artificial neural network comprises training the artificial neural network until the performance capability has achieved a predefined minimum level.

14. A computer program product, comprising program code stored on a non-transitory, computer-readable medium, the program code, when executed on a computer, causes the computer to carry out a method according to claim 1.

15. A device for data processing, comprising at least one field programmable gate array (FPGA) in which an artificial neural network is implemented for carrying out the method according to claim 1.

* * * * *